Jan. 23, 1951     H. A. SMITH     2,539,280

STEAM OPERATED HEATER FOR WATER AND OTHER LIQUIDS

Filed April 29, 1947

Inventor:-
Herbert A. Smith,
By:- Smith, Michael and Gardiner,
Attorneys.

Patented Jan. 23, 1951

2,539,280

UNITED STATES PATENT OFFICE 2,539,280

STEAM OPERATED HEATER FOR WATER AND OTHER LIQUIDS

Herbert Alwyn Smith, Cheltenham, England, assignor to Spirax Manufacturing Company Limited, Cheltenham, England Application April 29, 1947, Serial No. 744,550
In Great Britain May 4, 1946

9 Claims. (Cl. 261—39)

This invention has reference to a steam-operated heater for water and other non-corrosive liquids.

One object of the invention is to provide a heater of simple construction which is easy to install and which is efficient in operation.

Another object of the invention is to provide a heater which is adapted, by the admission of steam thereinto, to heat any reasonable quantity of liquid in a storage tank or container connected to the heater.

Another object of the invention is to provide a heater which is adapted automatically to heat a reasonable quantity of liquid in a storage tank or container connected to the heater to any predetermined temperature.

Still another object of the invention is to provide a heater wherein the liquid being heated is circulated automatically through a closed system which includes the heater.

It is also an object of the invention to provide a heater which operates silently, and in which there is little tendency for a hard insoluble substance, such as the substance commonly termed "fur," to be deposited on the internal surface thereof.

A further object of the invention is to enable the heating steam supply to be terminated automatically when the liquid being heated by circulation through the heater reaches the predetermined temperature, and to provide safety means for releasing pressure in the steam supply pipe if the said pressure approaches an excessive or dangerous value.

A still further object of the invention is to enable the component parts of the heater to assume their correct relative positions automatically when assembled in the heater body.

These and other objects of the invention will be apparent from the specific embodiment of the invention illustrated in the accompanying drawings, in which.

Figure 1:
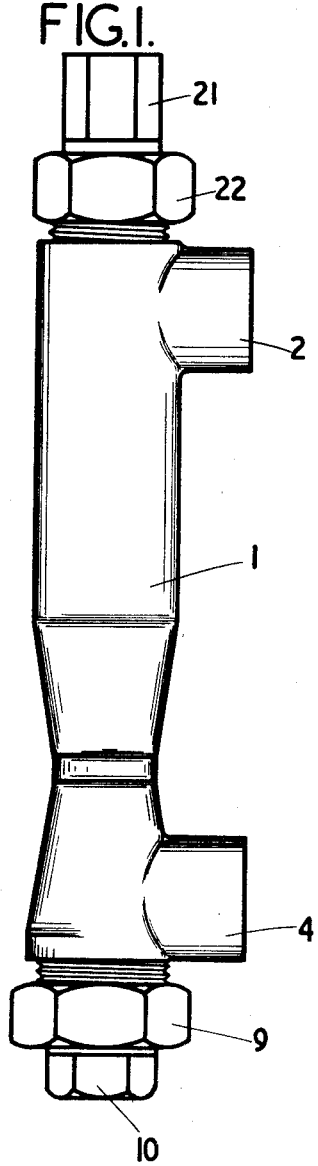
Figure 1 is an elevation of the heater.
Figure 2:
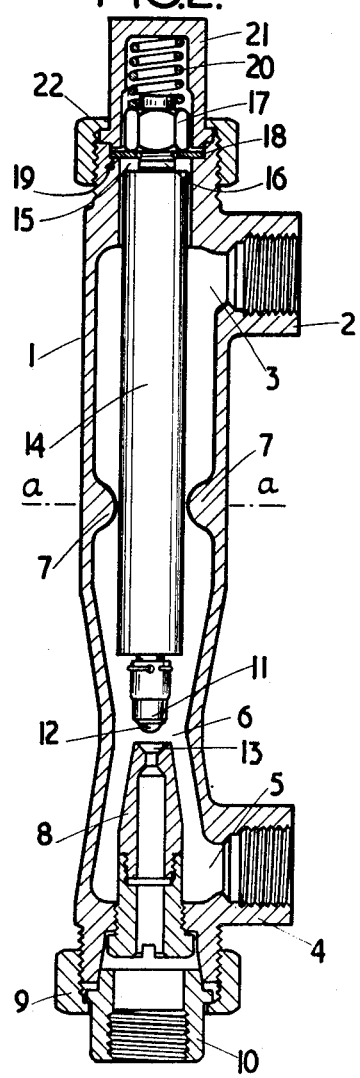
Figure 2 is a vertical sectional elevation of the same.
Figure 3:
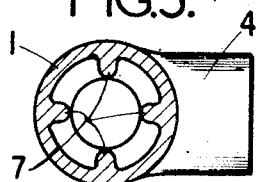
Figure 3 is a transverse section through the body or casing of the heater, along the line a—a, Figure 2.

The body or casing 1 of the heater is of hollow cylindrical form, and is provided at its upper end with a tapped boss 2 which opens into the interior of the body 1 through a heated water outlet port 3 adapted to receive a length of pipe for putting the body 1 into communication with a storage tank or like container for the water or other liquid to be heated, which pipe enters the tank or container at or slightly below the level of the liquid in said tank or container. Similarly, a tapped boss 4 and water inlet port 5 are provided at the lower end of the body 1 whereby the heater may be connected by a suitable length of pipe to the lower part of the tank or container to thereby create a closed circuit for the liquid.

The heater body 1 is formed, between the two ports 3 and 5 and at a position close to the lower port 5, with a restriction 6 and, substantially mid-way between said ports, is formed with a system of radial fins 7.

A steam supply nozzle 8 is screw-connected to, and is co-axial of, the lower portion of the body 1, and projects to such a distance inwardly of said body that its outlet is disposed within the restriction 6. An internally flanged nut 9 is screw-connected to the lower end of body 1 for securing to said body a tapped nipple 10 into which a steam supply pipe (not shown) is adapted to be connected for feeding steam to the heater through the nozzle 8.

A thermostatically controlled valve 11 is suspended from the upper part of the body 1, in co-axial alignment with the nozzle 8. The said valve 11 comprises a ball 12, which is adapted to abut closely upon an annular seating 13 surrounding the outlet of nozzle 8, and serves to cut off the supply of steam into the heater. The valve 11 is located below a casing 14 which encloses a heat sensitive unit, the lower end of said unit being free and being connected to the valve 11, whereas the upper end of said unit is anchored to the said casing 14. The casing 14 extends downwardly into the heater body 1 through a co-axial opening 15 in the upper end of the said body, and is provided with a threaded neck 16 to which a nut 17 is connected, a washer 18 being interposed between the nut and the upper end of the casing 14 and resting upon an annular abutment or shoulder 19 formed interiorly of the upper end of the body 1. Thus, the valve 11 is suspended in the body 1 by the washer 18 in such a manner that the said valve 11 and the casing 14 may be displaced longitudinally away from the upper end of the nozzle 8 through a distance equal to the space between the undersurface of the washer and the upper end of the said casing 14.

The nut 17 is loaded by a spring 20 which is compressed between the said nut and the crown of a cap 21 secured to the upper end of the body 1 by an internally flanged nut 22 screwed to the upper end of said body. Consequently, any longitudinal displacement of the valve and casing assembly away from the nozzle 8, takes place against the action of the spring, and the latter normally serves for retaining the nut 17 in contact with the washer 18 and the latter in contact with the annular abutment 19.

The casing 14 extends longitudinally and coaxially of the body 1 and it is maintained in its co-axial disposition by a series of fins 7, the inner edges of which fins are located in a circle having its axis in the centre line of the body 1 and of a diameter substantially equal to the diameter of the casing. The fins 7 thus centre the ball 12 of the valve 11 relatively to the axis of the nozzle 8, whereas the nut 17, washer 18 and annular abutment 19 determine the distance between the valve ball 12 and the nozzle seating 13. By rotation of the nut 17 upon the threaded neck 16, the distance between the said ball 12 and seating 13 may be varied for adjusting the temperature of the liquid at which the ball 12 impacts the seating 13 to close the nozzle outlet and cut off the supply of steam to the heater. This adjustment is facilitated by giving the interior of the mouth of the cap 21 the same non-circular configuration as the nut 17 so that both may be rotated manually upon slacking the flanged nut 22 upon the body 1.

The location of the nozzle outlet within the restriction 6 permits the nozzle, as steam is fed to the heater, to operate as an injector and thereby circulate the liquid around the closed circuit in which the container and heater are incorporated. The admission of steam heats the liquid in the heater, and the circulation of the liquid not only ensures that all the liquid in the circuit is raised to a substantially uniform temperature, but also eliminates or reduces noise at the nozzle and any tendency for hard or other undesirable substances (commonly known as "fur") to be deposited within the heater, more particularly in the region of the nozzle 8.

As the temperature of the liquid rises, the heat sensitive unit within the casing 14 expands and causes the valve 11 to move towards the nozzle 8. Eventually, when the liquid reaches a temperature determined by the initial adjustment of the nut 17 upon the neck 16, the ball 12 of the valve 11 impacts the nozzle seating 13 and cuts off the supply of steam through the said nozzle into the heater. Should the closing of the nozzle result in the creation of an excessive pressure in the steam supply line and the said nozzle, the said pressure displaces the valve, casing and nut assembly longitudinally within the body 1 away from the nozzle and against the action of the spring 20, so that the spring serves as a safety device.

I have illustrated and described one embodiment of my invention, but it will be understood that the invention may be otherwise embodied or practiced within the scope of the following claims.

Having described my invention, what I claim and desire to secure by Letters Patent is:

1. A steam operated liquid circulating heater comprising an elongated tubular body having open ends and having a radially extending cold liquid inlet adjacent one end and a radially extending heated liquid outlet adjacent the opposite end; a steam supply nozzle projecting into and closing that end of said body adjacent said cold liquid inlet and having its discharge end directed toward the opposite end of said body and terminating above said cold liquid inlet, said nozzle being adapted to be connected to a source of steam to circulate liquid from said inlet to said outlet and to heat said liquid during such circulation; means for closing that end of said body opposite that closed by said steam nozzle; a supporting member within said body and adjacent said last-mentioned means; an elongated, thermally-responsive, expansive and contractible assembly within said body responsive to variations in temperature of the liquid passing through said body, said assembly being axially disposed with respect to said steam nozzle and having one end supported by said supporting means and its opposite end terminating adjacent the discharge end of said steam nozzle; and a valve on that end of said thermally-responsive assembly adjacent the discharge end of said steam nozzle adapted to open and close said discharge end to control the discharge of steam from said nozzle in response to the expansive and contractive movements of said thermally-responsive assembly.

2. A steam operated liquid circulating heater as claimed in claim 1, in which the elongated body has an internal restriction intermediate the inlet and outlet ports and adjacent the discharge end of the steam nozzle, whereby discharge of steam from said nozzle will effect an injector action to cause circulation of the liquid from the inlet port to the outlet port.

3. A steam operated liquid circulating heater as claimed in claim 1 in which the interior of the elongated body is provided intermediate its ends with inwardly extending, circumferentially spaced fins, the inner ends of which fins are slidably engaged by the thermally-responsive assembly, whereby said assembly is guided during its expansive and contractive movements.

4. A steam operated liquid circulating heater as claimed in claim 1 in which the thermally-responsive assembly includes an elongated outer casing having one end supported by said supporting member, and its opposite end free and terminating adjacent the discharge end of said steam nozzle, and an elongated, thermally-responsive, expansible and contractible member within said casing having one end anchored to that end of the casing which is adjacent the supporting member and having its opposite end free and extending outwardly of the free end of the casing and terminating adjacent the discharge end of said steam nozzle, the valve for opening and closing the discharge end of said nozzle being positioned on said free terminal end of said thermally-responsive member.

5. A steam operated liquid circulating heater as defined in claim 1 in which the supporting member comprises a disc having an aperture therein, and in which the end of the thermally-responsive assembly opposite that on which the valve is located is threaded and passes freely through the aperture in said disc, and in which a nut is threaded on said threaded end on the opposite side of the disc to the thermally-responsive assembly to support said thermally-responsive assembly from said disc.

6. A steam operated liquid circulating heater as defined in claim 5 in which the tubular body adjacent that end opposite the end closed by the steam nozzle is provided with an internal flange for supporting the periphery of said apertured disc.

7. A steam operated liquid circulating heater as defined in claim 5 in which a compression spring is disposed between the means which closes that end of the body opposite that closed by the steam nozzle and the nut, which spring opposes bodily axial movement of said thermally-responsive assembly in a direction away from the discharge end of the steam nozzle.

8. A steam operated liquid circulating heater as defined in claim 7, in which the means for closing that end of the body opposite that closed by the steam nozzle comprises a cup-like member, and in which the said compression spring is housed within said cup-like member and extends between the closed end of said cup-like member and said nut.

9. A steam operated liquid circulating heater as defined in claim 7 in which the means for closing that end of the body opposite that closed by said steam nozzle comprises a cup-like member rotatably secured to said end of the body and having a non-circular inner portion slidably but non-rotatably engaging said nut, whereby rotation of said cup-like member will simultaneously effect rotation of said nut to adjust the position of the valve on the opposite end of the thermally-responsive assembly with respect to the discharge end of said steam nozzle.

H. ALWYN SMITH.

REFERENCES CITED

The following references are of record in the file of this patent:

UNITED STATES PATENTS

| Number | Name | Date |
|---|---|---|
| Re. 22,603 | Adlam | Feb. 20, 1945 |
| 92,622 | Mock | July 13, 1869 |
| 1,152,459 | Weld | Sept. 7, 1913 |
| 1,243,999 | Snediker | Oct. 23, 1917 |
| 2,212,288 | Decker | Aug. 20, 1940 |

FOREIGN PATENTS

| Number | Country | Date |
|---|---|---|
| 417,312 | Great Britain | Oct. 2, 1934 |
| 567,799 | Great Britain | Mar. 5, 1945 |